United States Patent [19]

Siemers et al.

[11] 4,328,285

[45] May 4, 1982

[54] METHOD OF COATING A SUPERALLOY SUBSTRATE, COATING COMPOSITIONS, AND COMPOSITES OBTAINED THEREFROM

[75] Inventors: Paul A. Siemers, Clifton Park; Douglas W. McKee, Burnt Hills, both of N.Y.

[73] Assignee: General Electric Company, Schenectady, N.Y.

[21] Appl. No.: 170,764

[22] Filed: Jul. 21, 1980

[51] Int. Cl.$^3$ .................. B32B 15/20; B05D 1/10
[52] U.S. Cl. ...................... 428/633; 427/34; 427/190; 428/472; 428/678
[58] Field of Search ........ 428/629, 632, 633, 678–680, 428/472, 939; 427/34, 190; 501/103

[56] References Cited

U.S. PATENT DOCUMENTS

| | | | |
|---|---|---|---|
| 3,223,538 | 12/1965 | Weigert | 501/103 |
| 4,247,249 | 1/1981 | Siemers | 415/174 |
| 4,248,940 | 2/1981 | Goward et al. | 428/633 |

OTHER PUBLICATIONS

McKee, D. W. et al., "Resistance of Thermal Barrier Ceramic Coatings to Salt Corrossion", *Thin Solid Films*, pp. 439–445, (1980).
Calcium Silicates: A New Class of Highly Regenerative Sorbents for Hot Gas Desulfurization, Yang et al., AlChE Journal, (vol. 25, No. 5), pp. 811–819, Sep. 1979.
Thermal Barrier Coatings: Burner Rig Hot Corrosion Test Results, Hodge et al., DOE/NASA/2593-78/3, NAS TM-79005, Oct. 1978.
Ceramic/Metallic Thermal Barrier Coatings for Gas Turbine Engines, Wilkins et al., Preprints of Papers for 8th International Thermal Spraying Conference, Miami Beach, Fla., USA, Sep. 27–Oct. 1, 1976, pp. 10–18.
Accelerated Oxidation by Vanadium Pentoxide, Fairman, Chemistry and Industry, Nov. 14, 1959.
The Residual Oil Ash Corrosion Problem, Slunder, Corrosion, vol. 15, No. 11, Nov. 1959.
Vanadium—A Bad Actor in Fuels, Norris, Reprint from Marine Engineering/Log, Apr. 1959.
Proceedings of the 1st Conference on Advanced Materials for Alternative Fuel Capable Directly Fired Heat Engines, Jul. 31–Aug. 3, 1979, Maine Maritime Academy, Castine, Me., McKee et al., Resistance of Thermal Barrier Ceramic Coatings to Hot Salt Corrosion, pp. 258–269.
High Temperature Coatings for Protecting Hot Components in Gas Turbine Engines, Restall, Metallurgia, Nov. 1979, pp. 676–685.

*Primary Examiner*—Michael L. Lewis
*Attorney, Agent, or Firm*—William A. Teoli; James C. Davis, Jr.

[57] ABSTRACT

A method is provided for improving the corrosion resistance of superalloy substrates, such as gas turbine blades, by initially coating the superalloy with an intermediate bonding alloy, followed by plasma spraying the resulting treated surface with cerium oxide or a sprayable blend of cerium oxide and zirconium oxide. The resulting metal oxide-super alloy composite has been found to be resistant to vanadium and sulfur dioxide corrosion.

4 Claims, No Drawings

METHOD OF COATING A SUPERALLOY SUBSTRATE, COATING COMPOSITIONS, AND COMPOSITES OBTAINED THEREFROM

BACKGROUND OF THE INVENTION

Prior to the present invention, as shown by U.S. Pat. Nos. 4,055,705, Palmer et al and 4,095,003, Weatherly et al, superalloys used in the turbines of jet aircraft, were often coated with ceramic base materials, for example, blends of zirconium oxide and calcium oxide, which were plasma deposited onto the surface of the superalloy. In most instances, an intermediate metallic bonding layer, such as NiCrAlY, was applied onto the superalloy prior to spraying with a metal oxide. Although improved oxidation resistance was achieved, based on the use of such thermal barrier coating, spalling of the ceramic often resulted causing separation of the ceramic from the surface of the superalloy and rapid deterioration of the superalloy.

One of the principal causes of such spalling was the tendency of the zirconium oxide to transform its crystalline structure at elevated temperatures causing a breakdown of the adherent ceramic layer on the metal substrate. Efforts to reduce this tendency of the zirconium oxide to crystallize resulted in the use of yttrium oxide as a stabilizer in a zirconium oxide-yttria blend. Experience has shown, however, that under some conditions, vanadium impurities often present in turbine fuels may cause accelerated failure of these yttrium containing barrier coatings as a result of the reaction of the yttria component with vanadate salts present in salt deposits formed in the turbine to produce yttria reaction products and consequent destabilization of the zirconium oxide phase.

Zirconium oxide coatings containing calcium additives, such as calcium oxide or calcium silicate, are also subject to degradation in the presence of combustion gases containing sulfur dioxide because of the conversion of the calcium oxide stabilizer to gypsum calcium sulfate.

The present invention is based on the discovery that cerium oxide, or zirconium oxide stabilized with cerium oxide, resists the formation of such vanadate corrosion products thus rendering the ceramic coating more resistant to vanadium impurities over an extended period of time. In addition, such cerium oxide containing ceramic coatings are not affected by gases containing sulfur dioxide.

As a result, the application of cerium oxide or cerium oxide-zirconium oxide blends onto gas turbine hot section components offer a means for increasing parts lives and turbine operating efficiencies by providing increased corrosion resistance and/or reduced metal temperatures by the thermal barrier concept. The resulting ceramic coating is typically formed with an arc plasma spray generator, in which a continuous high power DC arc is used to ionize an inert gas such as argon or argon-hydrogen to produce a high temperature/high velocity plasma. Cerium oxide powder or blend thereof is injected into the plasma stream, heated to a molten or semi-plastic state and accelerated to a high velocity prior to impact on the alloy substrate being coated. In order to produce adherent coatings, a bond layer of MCrAlY is generally applied to the alloy surface prior to the formation of the coating, where M is a metal selected from iron, nickel or cobalt, or mixtures thereof.

STATEMENT OF THE INVENTION

In the method for protecting the surfaces of shaped superalloys against oxidation and corrosion comprising initially plasma spraying the superalloy surface with a bonding layer followed by plasma spraying with a blend of either zirconium oxide and yttria, or zirconium oxide and calcium oxide, whereby the resulting coated superalloy substrate is subjected to accelerated failure in the event such coating is contacted with the combustion products of turbine fuel having vanadium, or sulfur oxide impurities at elevated temperatures, resulting in the destabilization and spalling of the zirconium oxide coating from the surface of the superalloy, the improvement which comprises, plasma spraying the surface of the superalloy with cerium oxide, or a zirconium oxide-cerium oxide blend, having at least 15% by weight of cerium oxide, whereby failure of the resulting ceramic coating due to reaction with vanadium or sulfur oxide impurities is eliminated.

The metallic oxide powders or powdered metal oxide useful in plasma spraying, which hereinafter can represent free-flowing cerium oxide, or a free-flowing blend of cerium oxide and zirconium oxide, which can be employed in the practice of the method of the present invention, can have a particle size in the range of 10 $\mu$m to 100 $\mu$m and can be made in accordance with the teaching of Krystyniak U.S. Pat. No. 3,373,119, assigned to the same assignee as the present invention. Accordingly, the metallic oxide powders in the form of spherical agglomerate particles can be prepared by spray drying a slurry of the powdered metal oxide. There can be added to the metal oxide powder, a liquid mixture of water, alcohol and an organic binder. The resulting slurry can have at least about 50% by weight solids while 48% to 52% is preferred. Suitable organic binders which can be used are, for example, methyl cellulose. A typical liquid mixture can consist of at least 35 weight percent water and from about 0 to 65 weight percent denatured alcohol. The binder can be present at from about 1.5 to about 2.25 weight percent. Other methods of forming the metal oxide powder are as follows:

(1) Mixing $CeO_2$ and $ZrO_2$ powders, pressing to form briquettes, sintering at 1600° C. or higher, crushing the sintered briquettes and sieving the crushed briquettes to form powder with a particle size ranging from 10 to 100 $\mu$m.

(2) Dissolving soluble salts of zirconium and cerium such as the nitrates in an aqueous media, precipitating the zirconium and cerium as oxalates or acetates from the aqueous media, calcining the mixed products at 1000° C. or greater to decompose the oxalates or acetates to cerium and zirconium oxides.

The superalloys which can be used in the practice of the plasma spray process of the present invention are, for example, the nickel-base alloys IN-738, René 80, 713C and the cobalt-base alloys X-40, MAR-M 509 and FSX-414.

Superalloy substrates which can be plasma sprayed are, for example, turbine blades, vanes, combustor liners, transition pieces and other hot gas path components. An intermediate bonding layer such as nickel-chromium, nickel-aluminum, CoCrAlY or a similar alloy material over which is plasma sprayed the metallic oxide layer can be employed.

In the practice of the present invention, a superalloy substrate is initially plasma sprayed with the aforementioned bonding layer. A melt temperature in the range of at least about 1400° C. can be employed. When plasma spraying the cerium oxide-zirconium oxide blend, a melt temperature of at least 2000° C. has been found effective, while a melt temperature of at least 2600° C. will provide effective results in instances where pure cerium oxide is used.

The bond coating thickness can be from about 3 mils to 7 mils while the metal oxide ceramic can be applied at from about 3 mils to about 30 mils.

In order that those skilled in the art will be better able to practice the present invention, the following examples are given by way of illustration and not by way of limitation. All parts are by weight.

EXAMPLE 1

A Rene 80 pin is initially plasma-sprayed with a Ni-22Cr-10Al-1Y bond coat. There is then plasma sprayed onto the resulting coated pin, a $CeO_2$-$ZrO_2$ powder having an average particle size in the range of about 10-44 μm and about 26% by weight of $CeO_2$ which is prepared by the above-described spray drying technique. The plasma spray temperature exceeds 2000° C.

The $CeO_2$-$ZrO_2$ ceramic coated Rene 80 pin is then subjected to hot oxidation and thermal shock conditions using a cyclic furnace test. There is utilized in the test, a 5 minute heat-up from 150° to 1100° C., a 40 minute hold at 1100° C., followed by 15 minutes of airburst cooling which reduces the temperature to 140° C. The cubic-tetragonal structure of the $ZrO_2$ ceramic coating, revealed by X-ray diffraction analysis is found to be fully maintained after 400 hours of cyclic furnace testing.

Rene 80 pins, plasma sprayed with the above $CeO_2$-$ZrO_2$ blend by the above procedure, are then sprayed several times with an aqueous salt composition having about 50% by weight solids. The salt spraying is effected under ambient conditions and repeated several times until the pin is coated with at least 5 mg/cm² of deposited salt. The salt composition consists of by weight 79.3% $Na_2SO_4$, 16.6% $NaVO_3$, 2.3% $V_2O_5$, 0.8% $PbSO_4$, 1% $Pb_2V_2O_7$. The treated pins are then subjected to 100 hours heating at 900° C. This test simulates the conditions resulting from fuel combustion at 900° C. of a fuel containing by weight 10 ppm Na, 1% S, 5 ppm Pb, and 10 ppm V. After 100 hours of exposure, the $CeO_2$-$ZrO_2$ ceramic coating remained unchanged while the uncoated ends are severely corroded. In another salt test, a $Na_2SO_4$-62% $NaVO_3$ deposit simulated the combustion of a fuel having 10 ppm of Na, 1% of sulfur and 30 ppm V. After 100 hours exposure to the mixed salt at 900° C. in a simulated combustion gas, no corrosion cracking or degradation of the ceramic coating can be detected on the surface of the ceramic coated pin.

The above results establish that a plasma sprayed coating of a blend of cerium oxide and zirconium oxide can provide superior protection to superalloy surfaces from vanadium degradation and the degradation resulting from oxidation due to breakdown of the zirconium thermal barrier layer in the presence of oxide of sulfur.

EXAMPLE 2

A Rene 80 superalloy pin was initially plasma sprayed with a 0.0065 inch layer of NiCrAlY, followed by a 0.017 inch coating of cerium oxide in accordance with the procedure of Example 1. Subsequent annealing with argon for 2 hours at 1050° C. promoted sintering of the metal oxide and reduced the porosity of the resulting ceramic coating.

The above cerium oxide coated Rene 80 pin was uniformly sprayed with 5 mg/cm² of sodium sulfate and then heated at 900° C. in simulated combustion gas having 0.1% $SO_2$, 76% $O_2$ and the balance nitrogen, for 200 hours. At the end of the test, the coating was found to be intact and showed no obvious degradation.

Another Rene 80 pin coated in accordance with the above procedure with cerium oxide and sodium sulfate-sodium vanadate was subjected to a thermal cycling test at 750° C. and 900° C. for 24 hours at each temperature in sulfated combustion gas passed over a platinum gauze catalyst to achieve equilibrium levels of $SO_3$. After 200 hours exposure, the coated pin showed no cracking, although the uncoated end of the pin was badly corroded. In a third test, a cerium oxide coated pin was sprayed with a mixture of sodium sulfate and sodium vanadate, the latter being present at 62% by weight, based on the total weight of salt in the mixture. The salt coated pin was then heated at 900° C. in simulated combustion gas for 200 hours. After the test period, the coated pin was intact. However, the appearance of the untreated end of the pin indicated catastrophic vanadium corrosion.

EXAMPLE 3

Further corrosion tests with plasma-sprayed coatings containing blends of cerium oxide and zirconium oxide having 9 and 15% by weight of cerium oxide are carried out with mixed sodium sulfate-sodium vanadate deposits at 900° C. After 100 hours exposure in simulated combustion gas, the coating containing 9% cerium oxide is found to be cracked, whereas the coating containing 15% cerium oxide is found to be intact. A minimum content of approximately 15% ceraium oxide is therefore required in the coating for effective resistance to vanadium corrosion.

Although the above examples are directed to only a few of the very many variables of the present invention, it should be understood that the present invention is directed to a method using a much broader variety of superalloy substrates, bond coat and cerium oxide-zirconium oxide blends as shown in the description preceding these examples.

What we claim as new and desire to secure by Letters Patent of the United States:

1. A method for improving the oxidation resistance and corrosion resistance of a superalloy substrate from accelerated failure resulting from exposure to turbine fuel having vanadium or sulfur oxide impurities which comprises plasma spraying the surface of the superalloy substrate with a metallic alloy material to form a metallic bonding layer followed by plasma spraying with zirconium oxide that is stabilized with cerium oxide particles to form a $CeO_2$-$ZrO_2$ ceramic coating containing at least about 15% by weight of $CeO_2$.

2. A method in accordance with claim 1 where the metallic alloy bonding layer material is MCrAlY, where M is a metal selected from iron, nickel, or cobalt, or mixtures thereof.

3. A method in accordance with claim 1, where the $CeO_2$-$ZrO_2$ ceramic coating oxide has at least 26% by weight of cerium oxide.

4. A gas turbine article having improved resistance to oxidation and corrosion resulting from accelerated failure due to exposure to turbine fuel having vanadium or sulfur oxide impurities comprising a superalloy substrate, a metallic bonding layer and an exterior zirconium oxide that is stabilized with cerium oxide ceramic coating containing at least 15% by weight of $CeO_2$.

* * * * *